United States Patent
Dunne et al.

(10) Patent No.: US 9,313,251 B2
(45) Date of Patent: *Apr. 12, 2016

(54) SHARING A CONFIGURATION STATE OF A CLIENT DEVICE THAT MEETS A THRESHOLD LEVEL OF QOE

(71) Applicant: International Business Machines Corporation, Armonk, NY (US)

(72) Inventors: Jonathan Dunne, Dungarvan (IE); Paul B. French, Cork (IE); James P. Galvin, Jr., Georgetown, KY (US); Patrick J. O'Sullivan, Ballsbridge (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/625,729

(22) Filed: Feb. 19, 2015

(65) Prior Publication Data

US 2015/0381693 A1 Dec. 31, 2015

Related U.S. Application Data

(63) Continuation of application No. 14/315,482, filed on Jun. 26, 2014.

(51) Int. Cl.
*H04L 29/06* (2006.01)
*H04L 12/26* (2006.01)
*H04L 12/24* (2006.01)

(52) U.S. Cl.
CPC ............ *H04L 65/80* (2013.01); *H04L 41/0846* (2013.01); *H04L 43/065* (2013.01); *H04L 43/0847* (2013.01)

(58) Field of Classification Search
CPC combination set(s) only.
See application file for complete search history.

(56) References Cited

U.S. PATENT DOCUMENTS

| | | | |
|---|---|---|---|
| 8,442,030 B2 | 5/2013 | Dennison | |
| 8,499,087 B2 | 7/2013 | Hu | |
| 8,516,529 B2 | 8/2013 | Lajoie et al. | |
| 2012/0192216 A1* | 7/2012 | Chen | H04L 41/5025 725/14 |
| 2012/0297430 A1 | 11/2012 | Morgos et al. | |
| 2012/0311126 A1* | 12/2012 | Jadallah | H04L 41/5067 709/224 |

(Continued)

OTHER PUBLICATIONS

IBM: List od IBM Patents or Patent Applications Treated as Related (Appendix P).

(Continued)

*Primary Examiner* — Mulugeta Mengesha
(74) *Attorney, Agent, or Firm* — Cuenot, Forsythe & Kim, LLC (57) ABSTRACT

Arrangements described herein can include automatically monitoring, on a first client device receiving multimedia content, a first QoE associated with presenting the multimedia content by the first client device. The arrangements also can include automatically determining a configuration state of the first client device while presenting the multimedia content. The method further includes sharing, by the first client device, with at least a second client device at least a portion of the configuration state of the first client device while presenting the multimedia content, wherein the portion of the configuration state of the first client device is included in a candidate configuration that is a candidate for implementation on the second client device to improve a second QoE associated with presenting the multimedia content, or other multimedia content, by the second client device.

13 Claims, 6 Drawing Sheets

(56) References Cited

U.S. PATENT DOCUMENTS

| | | |
|---|---|---|
| 2013/0282899 A1 | 10/2013 | Kullos |
| 2013/0286868 A1* | 10/2013 | Oyman ............... H04W 24/06 370/252 |
| 2014/0040498 A1* | 2/2014 | Oyman ............... H04W 24/04 709/231 |

OTHER PUBLICATIONS

Dunne, J. et al., "Sharing a Configuration State of a Client Device That Meets a Threshold Level of QoE", U.S. Appl. No. 14/315,482, filed Jun. 26, 2014, 36 pages.

Park, S. et al., "Mobile IPTV: Approaches, Challenges, Standards, and QoS support," [online] Internet Computing, IEEE 13, No. 3, 2009 [retrieved Jun. 25, 2014] pp. 23-31, retrieved from the Internet: <http://gredes.ifto.edu.br/wp-content/uploads/Mobile-IPTV.pdf>, 9 pg.

Xiao, Y. et al. "Internet Protocol Television (IPTV): The killer application for the next-generation Internet," IEEE Communications Magazine, Nov. 2007 [retrieved Jun. 26, 2014] pp. 125-134, retrieved from the Internet: <http://scholarworks.rit.edu/cgi/viewcontent.cgi?article=1956&co>, 10 pg.

Zhang, J. et al. "QoS/QoE Techniques for IPTV Transmissions," [online] in IEEE Int'l. Symposium on Broadband Multimedia Systems and Broadcasting (BMSB'09), Aug. 2009 [retrieved Jun. 26, 2014] pp. 1-8, retrieved from the Internet: <https://merl.com/publications/docs/TR2009-010.pdf>, 8 pg.

\* cited by examiner

```
Automatically monitor, using a processor of a first client device receiving
multimedia content, a first QoE associated with presenting the multimedia
content by the first client device
505
```

↓

```
Automatically determine a configuration state of the first client device while
presenting the multimedia content
510
```

↓

```
Share, by the first client device, with at least a second client device at least a
portion of the configuration state of the first client device while presenting the
multimedia content, wherein the portion of the configuration state of the first
client device is included in a candidate configuration for implementation on the
second client device to improve a second QoE associated with presenting the
multimedia content, or other multimedia content, by the second client device
515
```

Receive, by a configuration coordinator, from a first client device a first QoE associated with presenting the multimedia content by the first client device and a first configuration state of the first client device
605

↓

Analyze, using a processor of the configuration coordinator, the first QoE associated with presenting the multimedia content by the first client device and the first configuration state of the first client device to determine whether the first QoE meets a threshold level
610

↓

Responsive to determining, based at least in part on analyzing the first QoE associated with presenting the multimedia content by the first client device, that the first QoE meets the threshold level, communicate, by the configuration coordinator, to at least a second client device at least a portion of the first configuration state of the first client device in a candidate configuration for the second client device
615

FIG. 6

SHARING A CONFIGURATION STATE OF A CLIENT DEVICE THAT MEETS A THRESHOLD LEVEL OF QOE

CROSS-REFERENCE TO RELATED APPLICATIONS

This application is a Continuation of U.S. application Ser. No. 14/315,482, filed on Jun. 26, 2014, the entirety of which is incorporated herein by reference.

BACKGROUND

Arrangements described herein relate to Quality of Experience (QoE) for multimedia content communicated via a packet switched network.

Internet Protocol television (IPTV) is a system through which television services are delivered using the Internet Protocol suite over a packet-switched network, such the Internet, instead of being delivered through traditional terrestrial, satellite signal, and cable television formats. When delivering multimedia content (e.g., audio/video content) via IPTV, IPTV service providers typically measure and monitor the QoE of an IPTV stream as it travels through a network to a user's audio/video playback device. The QoE generally indicates the quality of multimedia content received for playback on client devices.

The QoE measurements typically include both intrusive measurements and non-intrusive measurements. Using an intrusive measurement, for example, video can be decoded as it traverses through the network and compared to a perfect reference video in order to detect a level of degradation in the received video. Using a non-intrusive measurement, for example, a mathematical algorithm can be applied to various parameters detected in a network to determine network metrics, such as jitter, delay and packet loss.

SUMMARY

A method includes automatically monitoring, using a processor of a first client device receiving multimedia content, a first QoE associated with presenting the multimedia content by the first client device. The method also includes automatically determining a configuration state of the first client device while presenting the multimedia content. The method further includes sharing, by the first client device, with at least a second client device at least a portion of the configuration state of the first client device while presenting the multimedia content, wherein the portion of the configuration state of the first client device is included in a candidate configuration that is a candidate for implementation on the second client device to improve a second QoE associated with presenting the multimedia content, or other multimedia content, by the second client device.

Another method includes receiving, by a configuration coordinator, from a first client device a first QoE associated with presenting the multimedia content by the first client device and a first configuration state of the first client device. The method also includes analyzing, using a processor of the configuration coordinator, the first QoE associated with presenting the multimedia content by the first client device and the first configuration state of the first client device to determine whether the first QoE meets a threshold level. The method further includes, responsive to determining, based at least in part on analyzing the first QoE associated with presenting the multimedia content by the first client device, that the QoE meets the threshold level, communicating, by the configuration coordinator, to at least a second client device at least a portion of the first configuration state of the first client device in a candidate configuration for the second client device.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to Quality of Experience (QoE) for multimedia content communicated via a packet switched network. More particularly, arrangements described herein relate to determining whether a configuration state of a client device provides for a threshold level (e.g., a threshold value) of QoE associated with presenting the multimedia content on the client device. If so, the configuration state, or at least a portion thereof, can be shared with one or more other client devices as a candidate configuration for the other client devices. The other client devices can change their current configuration based on the candidate configuration to improve the level of QoE associated with presenting the multimedia content on the other client devices.

Several definitions that apply throughout this document will now be presented.

As defined herein, the term "client device" means a device or system, including at least one processor, configured to receive multimedia content via a packet switched network and present at least a video portion of the multimedia content on a display.

As defined herein, the term "packet switched network" means a communication network that groups transmitted data, regardless of content, type or structure, into suitably sized blocks, called packets As defined herein, the term "multimedia content" means content including at least video. Multimedia content also may include, in addition to video, audio, text and/or one or more images.

As defined herein, the term "multimedia content stream" means a data stream, carrying multimedia content, communicated to a client device.

As defined herein, the term "quality of experience" means a qualitative measure of a user's experience viewing and/or listening to multimedia content presented by a client device. A "quality of experience" can include a value indicating a level of the qualitative measure of the user's experience viewing and/or listening to multimedia content presented by a client device, and/or a "quality of experience" can include one or more values of parameters that affect the level of the qualitative measure of the user's experience viewing and/or listening to multimedia content presented by a client device.

As defined herein, the term "QoE" means an acronym for the term "quality of experience."

As defined herein, the term "perceptual evaluation of video quality" means a parameter, having an assigned value, representing a picture quality of video content (e.g., video contained in multimedia content). "Perceptual evaluation of video quality" can be derived by an algorithm implementing a mean opinion score, such as a five-point mean opinion score.

As defined herein, the term "PEVQ" means an acronym for the term "perceptual evaluation of video quality."

As defined herein, the term "configuration state" means a state of a client device's configuration at a particular time with respect to a plurality of configuration settings. A configuration state need not indicate all of the client device's configuration settings. For example, a configuration state may indicate configuration settings that potentially impact presentation of multimedia content on the client device.

As defined herein, the term "candidate configuration" means a configuration state communicated to a client device as a candidate for implementation on the client device. A client device can implement a "candidate configuration" by changing the client devices current configuration to match, at least in part, the "candidate configuration."

As defined herein, the term "configuration coordinator" means a processing system including at least one processor at least configured to receive from client devices configuration states of the client devices and QoEs associated with presenting multimedia content by the client devices, and share certain ones of the configuration states with other client devices as candidate configurations.

As defined herein, the term "share" means to communicate information from one client device to arrive at another client device either in an original state or in a modified state. For example, a first client device can share information with a second client device by directly communicating the information to the second client device, or by communicating the information to a third device or system which processes the information and communicates at least a portion of the information to the second client device.

As defined herein, the term "social cohort" means a user who is socially connected to other users in a particular group of users. Users who are social cohorts can be users who are associated with a same organization or division within an organization, users who are socially connected via a social networking system, or users who belong to the same group of acquaintances or friends.

As defined herein, the term "regression model algorithm" means an algorithm that performs a regression analysis, which is a statistical process known to those skilled in the art for estimating relationships among variables (e.g., parameters).

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "real time" means a level of processing responsiveness that a user or system senses as sufficiently immediate for a particular process or determination to be made, or that enables the processor to keep up with some external process.

As defined herein, the term "user" means a person (i.e., a human being).

Figure 1:
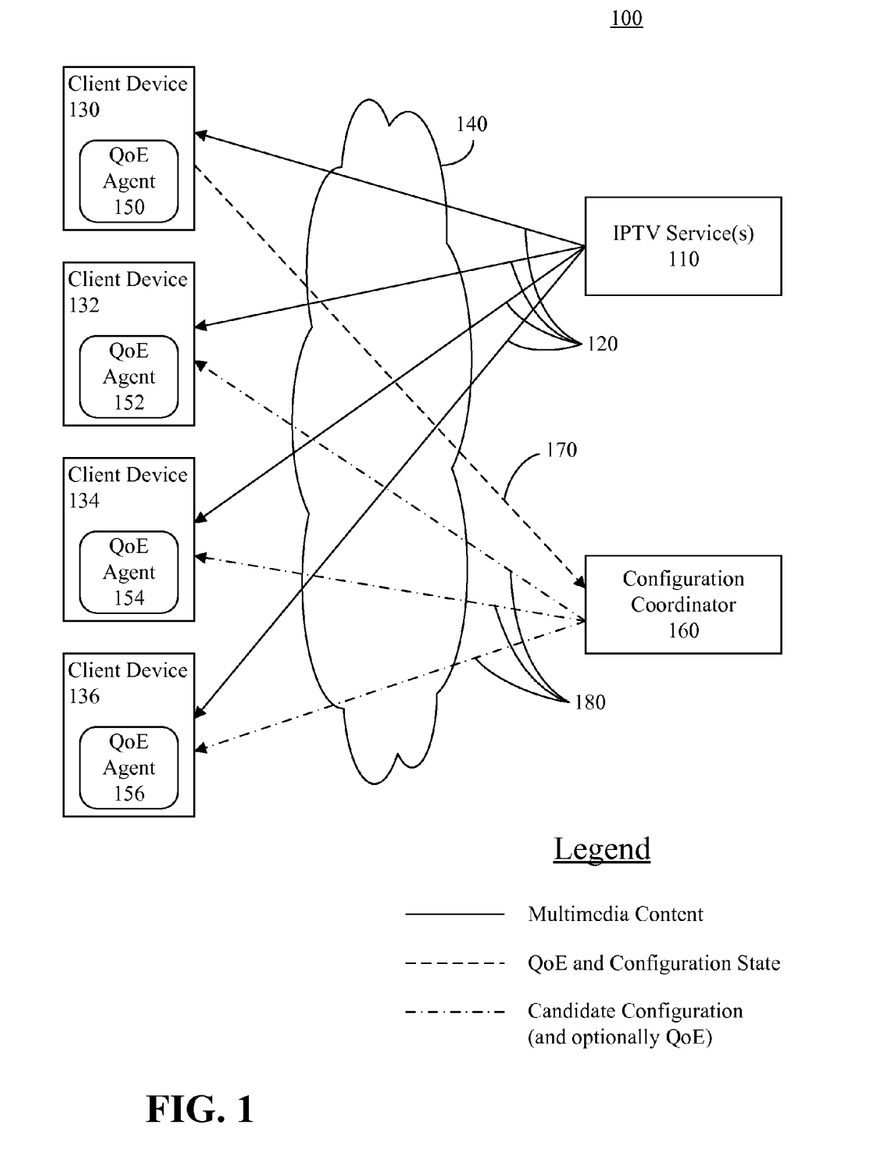
FIG. 1 is a block diagram illustrating an example of a network data processing system.

FIG. 1 is a block diagram illustrating an example of a network data processing system (hereinafter "system") 100. The system 100 can include at least one Internet Protocol television (IPTV) service 110. The IPTV service 110 can include one or more processing systems, each including at least one processor, configured to stream multimedia content 120 to a plurality of client devices 130, 132, 134, 136.

The IPTV service 110 can stream the multimedia content 120 to the client devices 130-136 via one or more communication networks 140. The communication network(s) 140 is/are the medium used to provide communications links between various devices and data processing systems connected together within system 100. The communication network(s) 140 may include connections, such as wire, wireless communication links, or fiber optic cables. The communication network(s) 140 can be implemented as, or include, any of a variety of different communication networks such as a wide area network (WAN), a local area network (LAN), a wireless network, a mobile network, a Virtual Private Network (VPN), the Internet, the Public Switched Telephone Network (PSTN), or the like. One or more of communication network(s) 140 can be packet switched networks.

The client devices 130-136 can be any devices configured to receive multimedia content streamed from the IPTV service(s) 110 and present the multimedia content to a user. For example, the client devices 130-136 can present video content on one or more displays and present audio content via one or more output audio transducers (e.g., loudspeakers, headphones and the like). In this regard, the client devices 130-136 can be implemented as computers (e.g., workstations, desktop computers, mobile computers, laptop computers, tablet computers, etc.), smart phones, personal digital assistants (PDAs), multimedia receivers, set-top boxes, and the like. Further, the client devices 132-136 can be devices similar to the client device 132. In this regard, the client devices 132-136 can have hardware configurations equivalent to, or at least partially equivalent to, the client device 130, use the same operating system as the client device 130, etc. Nonetheless, the present arrangements are not limited in this regard. In one aspect, each of the client devices 130-136 can be associated with a respective user, and the users can be members of a particular group. For example, the users can be social cohorts.

Each client device 130, 132, 134, 136 can include a respective QoE agent 150, 152, 154, 156. Each QoE agent 150-156 can be implemented as an application, plugin, or other suitable program code executed by a processor on the respective client devices 130-136. Each QoE agent 150-156 can be configured to, while a respective client device 130-136 is receiving and presenting the multimedia content 120, automatically monitor a QoE associated with presenting the multimedia content 120 by the respective client devices 130-136.

Each QoE agent 150-156 can monitor network specific QoE parameters, which are QoE parameters reflecting the quality of the transmission of the multimedia content stream over the communication network(s) 140 to the respective client devices 130-136. These network QoE parameters affect presentation of the multimedia content 120 by the client devices 130-136. Examples of such network QoE parameters include, but are not limited to, latency, packet loss, frame loss and jitter occurring during communication of the multimedia content stream from the IPTV service 110 to the client devices 130-136 via one or more communication networks 140. The network QoE parameters also can include the type of compression being used to compress the multimedia content 120. Examples of such compression include Moving Picture Experts Group (MPEG) compression schemes, such as MPEG-2 and MPEG-4, though other types of compression are within the scope of the present arrangements. Monitoring of network QoE parameters is known to those of ordinary skill in the art.

An example of frame loss is the loss of one or more intra-frames (I-frames), predicted frames (P-frames) and/or bidirectional frames (B-frames) in an MPEG formatted multimedia content stream. The QoE agents 150-156 can be configured to identify not only whether frames are lost, but also identify the types of frames that are lost. For example, loss of an I-frame can be more detrimental to QoE than loss of a P-frame or B-frame. Since the QoE agents 150-156 can identify the types of frames lost, the QoEs generated by the QoE agents 150-156 can provide highly accurate information that may be processed to improve presentation of the multimedia content 120.

Each QoE agent 150-156 also can monitor a perceptual evaluation of video quality (PEVQ) on a respective client device 130-136. PEVQ is another QoE parameter that affects presentation of the multimedia content 120. For example, the QoE agents 150-156 can execute a full reference (FR) algorithm, a reduced reference (RR) algorithm or a no reference (NR) algorithm to determine PEVQ of the multimedia content 120. Implementation of FR, RR and NR algorithms are known to those of ordinary skill in the art. Nonetheless, these are merely examples of algorithms that may be implemented to determine PEVQ, and the present arrangements are not limited to these particular algorithms; any other algorithms suitable for measuring PEVQ, or any other QoE parameters, are within the scope of the present invention.

Further, each QoE agent 150-156 can monitor the configuration state of a respective client device 130-136. The configuration states also affect presentation of the multimedia content 120 by the client devices 130-136. In this regard, even if the network QoE parameters are very good, the QoE on a particular client device 130 may be adversely affected by the client device's configuration. For example, due to a present configuration state of the client device 130, the client device may not have adequate resources available to provide a high level of QoA while presenting the multimedia content 120. A configuration state can include parameters indicating available memory on a respective client device 130-136, a performance level of a processor used by a respective client device 130-136, or any other hardware related data. A configuration state can include parameters indicating types and/or versions of software executed on a respective client device 130-136, types of background tasks and/or services executed on a respective client devices 130-136 (e.g., anti-virus software, etc.), a number of applications, background tasks and/or services executing on the respective client devices 130-136, and the like. Moreover, a configuration state can include parameters indicating which applications, background tasks and/or services are turned off.

The system 100 can include a configuration coordinator 160. The configuration coordinator 160 can include one or more processing systems, each including at least one processor, configured to receive from the client devices 130-136 (e.g., the QoE agents 150-156) configuration states of the client devices 130-136 and QoEs associated with presenting the multimedia content 120 by the client devices. The configuration coordinator 160 can persist such data into a computer readable storage medium, for example within a relational database. The configuration coordinator 160 can share the configuration state of each respective client device 130-136, or at least a portion thereof, with other client devices 130-136 (e.g., the QoE agents 150-156) as a candidate configuration. A client device 130-136 receiving a candidate configuration can process the candidate configuration as a candidate for implementation to re-configure the client device's configuration to improve the QoE associated with presentation of the multimedia content 120 by the client device 130-136. In this regard, the client devices 130-136 can subscribe to the configuration coordinator 160, indicating a particular group with which the client devices 130-136 are associated, for example a group of social cohorts to which users of the client devices 130-136 belong.

The configuration coordinator 160 can communicate with the client devices 130-136 via one or more communication networks 140. One or more of the communication networks 140 used by the configuration coordinator 160 to communicate with the client devices 130-136 can be the same as one or more of the communication networks 140 used by the IPTV service(s) 110 to stream the multimedia content 120 to the client devices 130-136, though this need not be the case. For example, a client device 130 can communicate receive the multimedia content 120 from the IPTV service(s) 110 via the Internet and a WAN, and can communicate with the configuration coordinator 160 via a LAN. On the other hand, the communication network(s) 140 used to stream the multimedia content 120 to the client device 130 can include the same LAN, WAN and/or the Internet which the client device 130 uses to communicate with the configuration coordinator 160.

In operation, the client device 130 can receive multimedia content 120 streamed by the IPTV service 110, and present the multimedia content 120 to a user. For example, the client device 130 can present the multimedia content 120 via a display integrated with, or attached to, the client device 130 and, optionally, one or more output audio transducers. The QoE agent 150 can monitor the QoE associated with presenting the multimedia content 120 by the client device 130, including any of the QoE parameters previously discussed. The QoE agent 150 also can monitor the configuration state of the client device 130 while presenting the multimedia content 120 (e.g., a current configuration state). In one aspect, during presentation of the multimedia content 120, the QoE agent 150 can present on the display a value indicating the level of QoE and/or values of individual QoE parameters. The QoE agent 150 also can provide a listing of currently executing (or active) applications and background services/tasks on the client device 130. In one aspect, such information need only be presented when the user chooses so, for example by selecting a menu item, icon, button or the like in a user interface.

Nonetheless, as the user viewing the multimedia content 120, the user will be able to tell by viewing and/or listening to the multimedia content 120 whether the QoE is adequate.

Based on a level (e.g., value) of the QoE and/or values of QoE parameters presented to the user, or the user's perception of the multimedia content 120, the user can make changes to one or more configuration settings on the client device 130 to change its configuration state. For example, the user can turn off certain background tasks and/or services, close certain applications, change display settings, uninstall software, install other software, etc. In one arrangement, in lieu of or in addition to user implemented changes, the QoE agent 150 can analyze the current configuration state, and automatically make changes to the configuration of the client device 130 to improve QoE. Regardless of whether changes are made manually by the user or automatically by the QoE agent 150, the QoE agent 150 can monitor the effects of such changes on the QoE and store data associating a QoE level (e.g., value) and/or values of QoE parameters with the respective configuration states resulting from the configuration changes.

The QoE agent 150 can communicate to the configuration coordinator 160 the QoE(s) associated with presenting the multimedia content 120 by the client device 130 and the respective configuration state(s) of the client device 130 while presenting the multimedia content 120 (collectively QoE/configuration state 170). A QoE that is communicated can be a QoE value representing a summation, average or weighted average of the various QoE parameter values and/or a QoE can include one or more values of the various QoE parameters. For example, the QoE agent 150 can communicate to the configuration coordinator 160 a listing of the QoE parameters and values assigned to each of the QoE parameters. In an arrangement in which configuration changes were made in an attempt to improve the QoE, the QoE agent 150 can communicate updated QoE/configuration state 170 each time configuration changes were made.

In one aspect, the QoE agent 150 can periodically communicate QoE(s) associated with presenting the multimedia content 120 by the client device 130 and the respective configuration state(s) of the client device 130 to the configuration coordinator 160. For example, if the client device 130, while presenting the multimedia content 120, maintains a QoE that meets a threshold level for a specified minimum amount of time, the QoE agent 150 can communicate the QoE/configuration state 170 to the configuration coordinator 160 at or after expiration of the specified period. In another example, QoE agent 150 can communicate the QoE/configuration state 170 to the configuration coordinator 160 at certain intervals, for example predefined intervals of time. In illustration, at the end of each time interval, regardless of the level of QoE, the QoE agent 150 can communicate the QoE/configuration state 170 to the configuration coordinator 160.

The QoEs and configuration states that are communicated to the configuration coordinator 160 need not be limited to QoEs that meet a threshold level. For example, certain configuration states will result in a low QoE levels, and these QoEs/configuration states 170 also can be communicated to the configuration coordinator 160. Accordingly, the configuration coordinator 160 will have data not only indicating configuration patterns that result in an acceptable level of QoE, but also data indicating configuration patterns (e.g., anti-patterns) that result in a low or unsatisfactory level of QoE. Such data can be processed by the configuration coordinator 160 to arrive at candidate configurations 180 to recommend to other client devices 132-134, as will be described.

In another aspect, the QoE agent 150 can communicate QoE(s) associated with presenting the multimedia content 120 by the client device 130 and the respective configuration state(s) of the client device 130 to the configuration coordinator 160 at the behest of a user of the client device 130. For example, if the user determines that the QoE is satisfactory to the user, the user can select a menu item, icon, button or the like in a user interface to initiate communication to the configuration coordinator 160 of the QoE associated with presenting the multimedia content 120 by the client device 130 and the respective configuration state of the client device 130.

The configuration coordinator 160 can receive one or more sets of QoE/configuration state 170 and determine whether, for each set, the QoE meets a threshold value, or that one or more of the QoE parameters satisfy certain conditions. Moreover, the configuration coordinator 160 can apply a regression model algorithm based on the QoE/configuration state 170 and QoEs/configuration states previously received from the client device 130 and/or other client devices 132-136, to determine which configuration state is best to optimize QoE for presentation of the multimedia content 120, or other multimedia content, on various client devices 132-136. In this regard, the configuration coordinator 160 can identify configuration patterns that achieve an acceptable QoE level and anti-patterns that result in a poor QoE level, and select configuration settings for the candidate configuration 180 accordingly. In illustration, the configuration coordinator 160 can determine that the configuration state of the client device 130, or certain configuration settings contained therein, conform to a configuration pattern that will achieve an acceptable QoE level and will improve QoE of multimedia content 120, or other multimedia content, presented by other client devices 134-136. If the QoE/configuration state 170 indicates a level of QoE that is not satisfactory, the configuration coordinator 160 can determine that the configuration state of the client device 130 will not improve QoE of multimedia content 120, and know to avoid including in the candidate configuration 180 one or more configuration settings contained in that configuration state.

In some instances, the best configuration state selected for a particular client device 132 need not be the same configuration state selected for another client device 134. In this regard, when applying the regression model algorithm, the configuration coordinator 160 can analyze the hardware configuration, available software and/or available configuration settings on each respective client device 132-134 to arrive at a candidate configuration to be recommended to each respective client device 132-134.

Responsive to determining that the QoE associated with presenting the multimedia content 120 by the client device 130 meets a threshold value, or the QoE parameters satisfy certain conditions (e.g., based on the regression model algorithm), the configuration coordinator 160 can communicate to the client devices 132-136 the configuration state of the client device 130, or at least a portion thereof, as a candidate configuration 180 for implementation on the respective client devices 132-136 in order to optimize the QoE for presenting the multimedia content 120, or other multimedia content, on those devices. For example, the candidate configuration 180 can indicate certain configuration changes that may be made on the respective client devices 132-136 in order to optimize the QoE for presenting the multimedia content 120, or other multimedia content, on those devices.

As noted, the candidate configuration 180 can include at least a portion of the configuration state of the client device 130, and even may include the entire configuration state. Nonetheless, based on the regression algorithm, the configuration coordinator 160 can include in the candidate configuration 180 one or more configuration settings obtained from other configuration states, and exclude from the candidate configuration 180 one or more configuration settings likely to adversely affect QoE. These other configuration states can include previous configurations states of the client device 130 and/or configuration states of other client devices 132-136. Thus, the candidate configuration 180 can include a combination of configuration settings contained in a plurality of different configuration states where the configuration settings are known to the configuration coordinator 160 to improve QoE.

Notably, reception of the QoE/configuration state 170 and communication of the candidate configuration 180 can occur in real time. That is, immediately upon receiving the QoE/configuration state 170 from the client device 130, the configuration coordinator 160 can process QoE/configuration state 170, as well as other QoE/configuration states, to determine the candidate configuration 180 for one or more of the client devices 132-136, and communicate the candidate configuration(s) 180 to such client devices 132-136.

In one arrangement, the configuration coordinator 160 also can communicate to the client devices 132-136 the QoE. The respective QoE agents 152-156 on the client devices 132-136 can analyze the QoE to determine whether the candidate configuration 180 is likely to improve QoE on the client devices 132-136 based, at least in part, on the current configuration states of the client devices 132-136. The respective QoE agents 152-156 also can analyze the QoE associated with presenting the multimedia content 120 by the client devices 132-136 and/or the QoE associated with presentation of other multimedia content to determine whether the candidate configuration 180 is likely to improve QoE on the client devices 132-136.

In an arrangement in which the candidate configuration 180 includes only configuration settings from the configuration state 170 of the client device 130, the QoE communicated with the candidate configuration 180 can be the QoE received from the client device 130, or another QoE derived from the QoE received from the client device 130 based upon which configuration settings in the configuration state 170 are used. In an arrangement in which the candidate configuration 180 includes a combination of configuration settings contained in a plurality of different configuration states, the configuration coordinator 160 can model the various configuration settings using respective QoE parameters/values associated with the various configuration settings. Based on the model, the configuration coordinator 160 can generate an anticipated QoE for the candidate configuration 180. In one aspect, the configuration coordinator 160 can communicate the anticipated QoE to one or more client devices 130-136 with the candidate configuration 180.

The QoE agents 152-156 can process the candidate configuration 180 to determine whether the candidate configuration 180, or a portion thereof, is applicable to the respective client devices 132-136. The QoE agents 152-156 also can process the QoE (e.g., the value of the QoE or values of QoE parameters contained in the QoE) to determine whether the candidate configuration 180, or a portion thereof, will improve on the QoE of the respective client devices 132-136 associated with presenting the multimedia content 120, or other multimedia content, by the respective client devices 132-136.

For example, if the client device 132 currently is executing a background task, such as anti-virus scanning, and the candidate configuration 180 indicates that such background task has been paused during presentation of the multimedia content 120 on the client device 130 to improve QoE on the client device 130, the QoE agent 152 can determine that pausing anti-virus scanning on the client device 132 will improve the QoE associated with presenting the multimedia content 120, or other multimedia content, by the client device 132. In another example, the client device 130 can execute a particular type of anti-virus software, which executes as a background service on the client device 130, and this particular type of anti-virus software can be indicated in the candidate configuration 180. If the client device 132 has a lower QoE than the client device 130 and executes a different type of anti-virus software, the QoE agent 152 can determine that changing the anti-virus software on the client device 132 to the anti-virus software used by the client device 130 will improve the QoE associated with presenting the multimedia content 120, or other multimedia content, by the client device 132. Any number of other determinations can be made by the QoE agent 152 based on the candidate configuration 180 and/or QoE parameters provided by the configuration coordinator 160, and the present arrangements are not limited in this regard.

In another arrangement, such determinations can be made by the configuration coordinator 160, and the respective QoE agents 152-156 can determine whether to implement the candidate configuration 180, or a portion thereof, applicable to the respective client device 132-136 based upon a recommendation whether to do so by the configuration coordinator 160. Such recommendation can be presumed based upon receiving the candidate configuration 180 from the configuration coordinator 160. Hence, any configuration parameters contained in the candidate configuration 180 that are applicable to the respective client devices 132-136 can be implemented by the respective client devices 132-136 to improve QoE.

Regardless of whether configuration changes are determined by the QoE agents 152-156 or recommended by the configuration coordinator 160, the QoE agents 152-156 can automatically implement certain configuration changes, automatically implement such changes with the approval of a user (e.g., by the user selecting a menu item, icon, button or the like), or prompt the user to make such configuration changes. For example, the QoE agents 152-156 can automatically pause certain background tasks/services, close certain applications, or only perform such actions if approved by the user. The QoE agents 152-156 also can prompt a user to uninstall certain software and install other software in its place when use of the other software in lieu of presently installed software will improve QoE, or do so automatically with the approval of the user. The user can be prompted to make configuration changes, or to approve configuration changes, via a pop-up window, a notification in a window provided by a QoE agent 152-156, a text message, an e-mail message, or any other suitable manner.

Certain configuration changes can be implemented temporarily by the QoE agents 152-156 while the multimedia content 120, or other multimedia content, is presented on the respective client devices 132-136. Responsive to presentation of the multimedia content 120, or other multimedia content, being completed, the QoE agents 152-156 can undo those configuration changes by reverting configuration settings back to their previous states. The previous states can be the states of the configuration settings before they were updated based upon the candidate configuration 180. For example, if a background task/service is paused by the QoE agent 152 during presentation of the multimedia content 120, the QoE agent 152 can automatically re-initiate the background task/service upon completion of presentation of the multimedia content 120 (other multimedia content).

In the above examples, the client QoE agents 152-156 may implement, or suggest, configuration changes for the client devices 132-136. Nonetheless, the QoE agents 152-156 also may share a QoE associated with presenting the multimedia content by their respective client devices 132-136, as well as the configuration states of the client devices 132-136 while presenting the multimedia content. For instance, based on QoEs/configuration states associated with the client devices 132-136, and the QoE/configuration state 170 associated with the client device 130, the configuration coordinator 160 can determine a candidate configuration 180 to improve on the QoE of the client device 130. The configuration coordinator 160 can communicate such information, or at least a portion thereof, to the client device 130 in a candidate configuration 180 for the client device 130, as previously described, and the QoE agent 150 of the client device 130 can implement or suggest one or more configuration changes on the client device 130 based on the candidate configuration 180 received. In this regard, each of the client devices 130-136 may share their QoEs/configuration states 170 with other client devices 130-136, and also receive candidate configurations 180 which may be processed to further improve on their QoEs.

Moreover, the candidate configuration 180 communicated by the configuration coordinator 160 to each client device 130-136 need not be the same for each client device 130-136. Indeed, the configuration coordinator 160 can analyze the current configuration state of each client device 130-136, and customize the candidate configuration 180 that is communicated to each of the respective client devices 130-136 accordingly. For instance, the candidate configuration 180 can apply a regression algorithm that analyzes each client device's current state, configuration states of other client devices, and their respective QoEs and/or QoE parameters to arrive at a candidate configuration 180 that is customized for each of the client devices 130-136.

Figure 2:
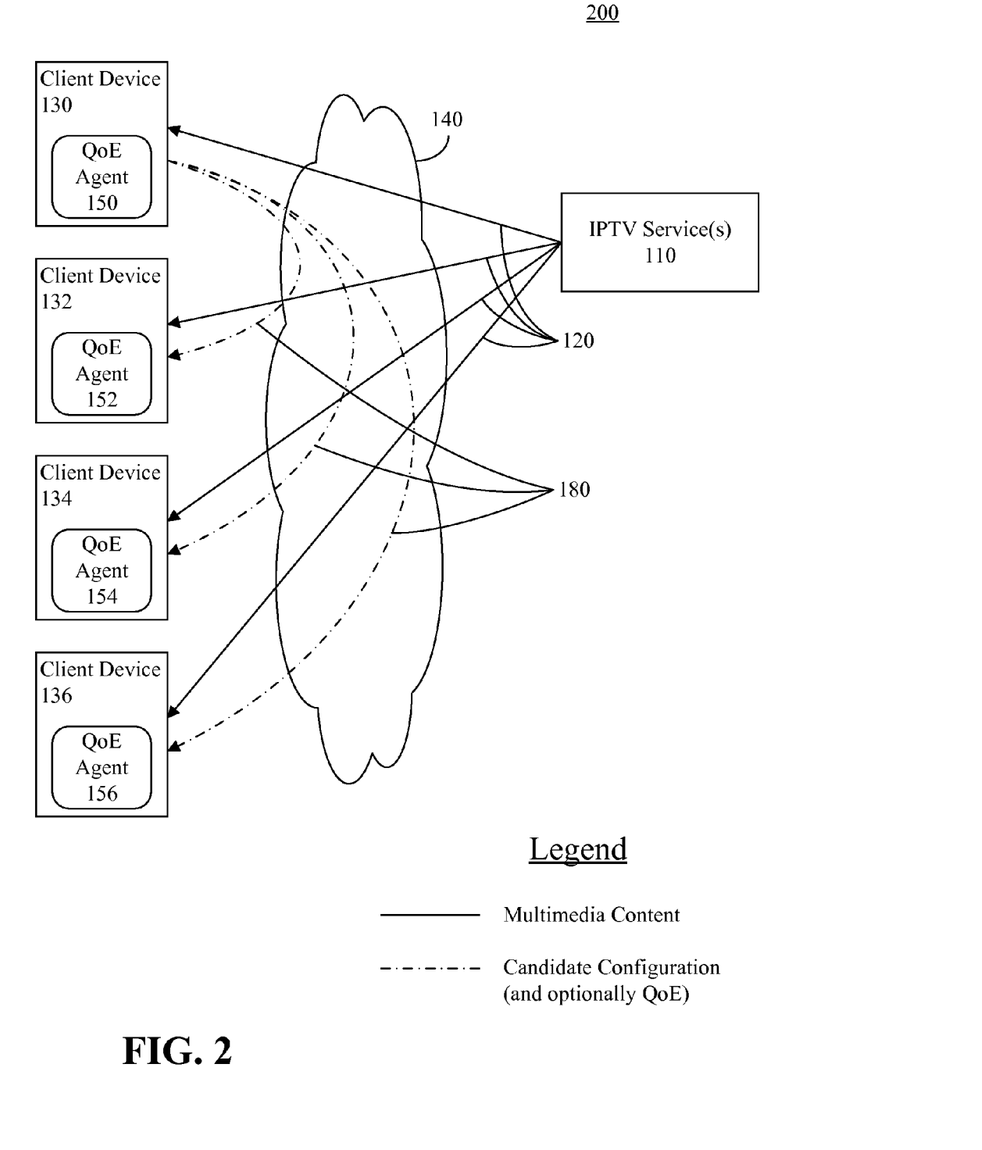
FIG. 2 is a block diagram illustrating another example of a network data processing system.

FIG. 2 is a block diagram illustrating another example of a network data processing system (hereinafter "system") 200. The system 200 of FIG. 2 is similar to the system 100 of FIG. 1, but does not include the configuration coordinator 160. In the system 200, the client device 130 can receive the multimedia content 120 from the IPTV service(s) 110 via the communication network(s) 140. Further, the client device 130 can share its configuration state with the client devices 132-136 as a candidate configuration 180. Similarly, each of the client devices 132-136 can share its configuration state with the other client devices 130-136. In one aspect, the information that is shared also can include the respective QoEs associated with presenting the multimedia content 120, or other multimedia content, by the client devices 130-136.

Again, each client device 130-136 can share its configuration state, and optionally its QoE, with other client devices 130-136. As noted, each client device 130-136 can share such information periodically or at the behest of a respective user. The respective QoE agents 150-156 can process such information as it is received from other client devices, as previously described, to determine whether a candidate configuration 180, or a portion thereof, will improve on the on the respective client devices 132-136 the QoE associated with presenting the multimedia content 120, or other multimedia content. The respective QoE agents 150-156 also can automatically implement and/or prompt respective users to implement corresponding configuration changes that will improve the QoE on the client devices 130-136, as previously described.

Figure 3:
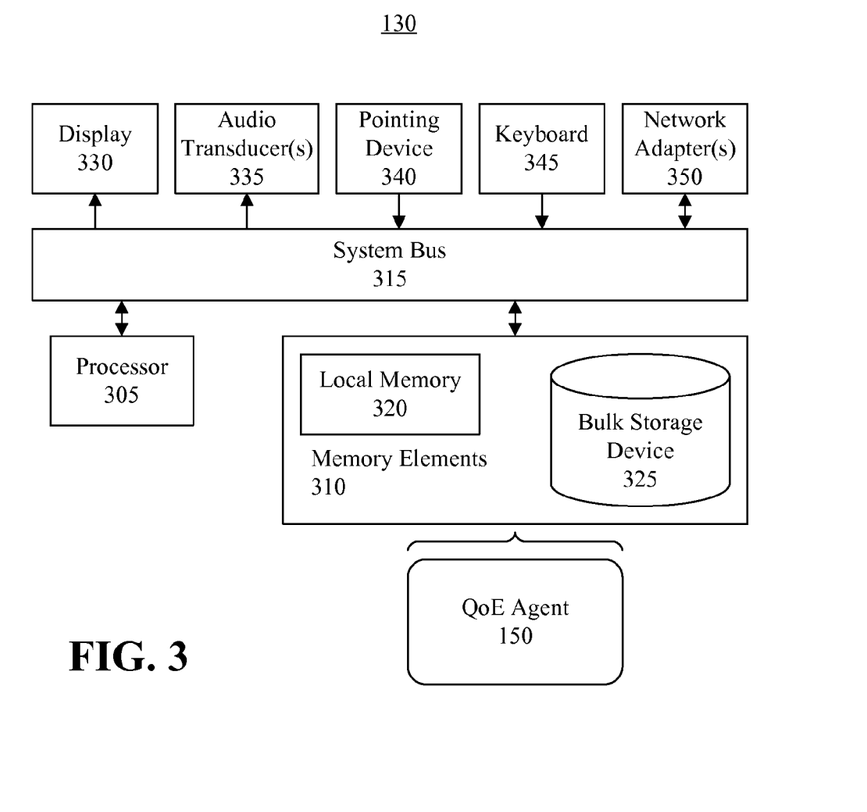
FIG. 3 is a block diagram illustrating example architecture for a client device.

FIG. 3 is a block diagram illustrating example architecture for a client device 130 of FIG. 1. The client devices 132-136 can include respective architectures similar to that of the client device 130.

The client device 130 can include at least one processor 305 (e.g., a central processing unit) coupled to memory elements 310 through a system bus 315 or other suitable circuitry. As such, the client device 130 can store program code within the memory elements 310. The processor 305 can execute the program code accessed from the memory elements 310 via the system bus 315.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The client device 130 also can include one or more cache memories (not shown) that provide temporary storage of at least some program code in order to reduce the number of times program code must be retrieved from the bulk storage device 325 during execution.

Input/output (I/O) devices such as a display 330, one or more output audio transducers 335 and, optionally, a pointing device 340 a keyboard 345 can be coupled to the client device 130. The I/O devices can be coupled to the client device 130 either directly or through intervening I/O controllers. For example, the display 330 can be coupled to the client device 130 via a graphics processing unit (GPU), which may be a component of the processor 305 or a discrete device. The output audio transducer 335 can be coupled to the client device 130 via one or more audio controllers, which also may be a component of the processor 305 or a discrete device. One or more network adapters 350 also can be coupled to client device 130 to enable client device 130 to become coupled to other systems, computer systems, remote printers, and/or remote storage devices, for example the IPTV service(s) 110, configuration coordinator 160 or other client devices 132-136 of FIGS. 1 and 2, through intervening private or public networks such as the communication network(s) 140 of FIGS. 1 and 2. Modems, cable modems, transceivers, and Ethernet cards are examples of different types of network adapters 350 that can be used with the client device 130.

As pictured in FIG. 3, the memory elements 310 can store the components of the client device 130, for example the QoE agent 150 of FIG. 1. Being implemented in the form of executable program code, the QoE agent 150 can be executed by the client device 130 and, as such, can be considered part of the client device 130. Moreover, the QoE agent 150, and any data processed by and generated by the QoE agent 150, are functional data structures that impart functionality when employed as part of the client device 130.

Figure 4:
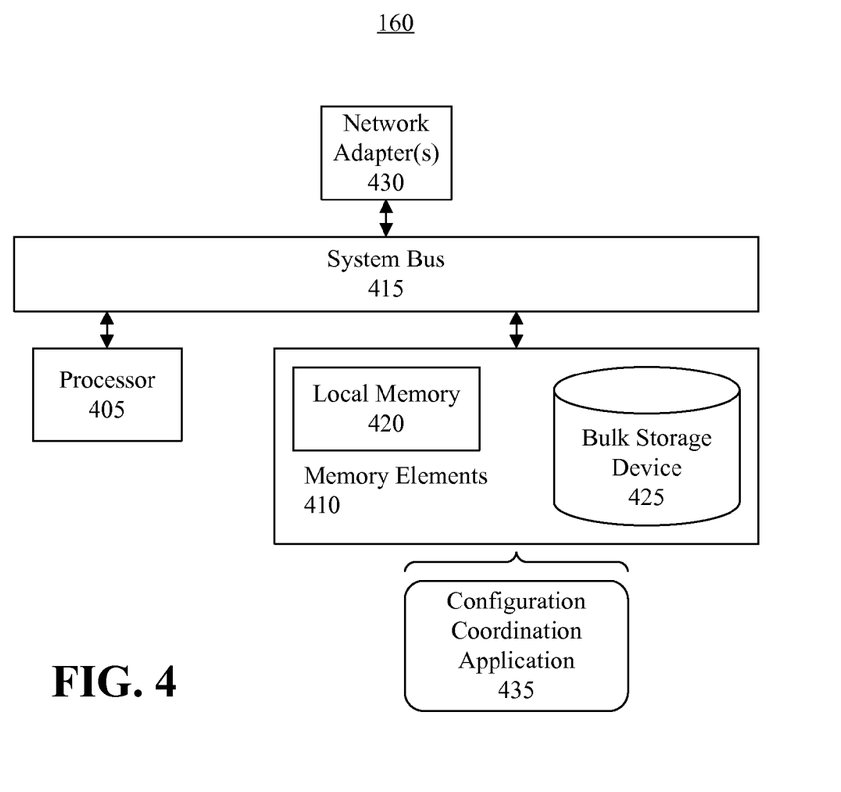
FIG. 4 is a block diagram illustrating example architecture for a configuration coordinator.

FIG. 4 is a block diagram illustrating example architecture for the configuration coordinator 160 of FIG. 1. The configuration coordinator 160 can include at least one processor 405 (e.g., a central processing unit) coupled to memory elements 410 through a system bus 415 or other suitable circuitry. As such, the configuration coordinator 160 can store program code within the memory elements 410. The processor 405 can execute the program code accessed from the memory elements 410 via the system bus 415.

The memory elements 410 can include one or more physical memory devices such as, for example, local memory 420 and one or more bulk storage devices 425. As noted, local memory 420 refers to RAM or other non-persistent memory device(s) generally used during actual execution of the program code. The bulk storage device(s) 425 can be implemented as a HDD, SSD, or other persistent data storage device. The configuration coordinator 160 also can include one or more cache memories (not shown) that provide temporary storage of at least some program code in order to reduce the number of times program code must be retrieved from the bulk storage device 425 during execution.

One or more network adapters 430 can be coupled to configuration coordinator 160 to enable configuration coordinator 160 to become coupled to other systems, computer systems, remote printers, and/or remote storage devices, for example the client devices 130-136 of FIG. 1, through intervening private or public networks such as the communication network(s) 140 of FIG. 1. Modems, cable modems, transceivers, and Ethernet cards are examples of different types of network adapters 430 that can be used with the configuration coordinator 160.

As pictured in FIG. 4, the memory elements 410 can store the components of the configuration coordinator 160, for example a configuration coordination application 435. The configuration coordination application 435 can configured to be executed by the processor 405 to implement the processes described herein as being performed by the configuration coordinator 160. Being implemented in the form of executable program code, configuration coordination application 435 can be executed by the configuration coordinator 160 and, as such, can be considered part of the configuration coordinator 160. Moreover, the configuration coordination application 435 and any data processed by and generated by the configuration coordination application 435 are functional data structures that impart functionality when employed as part of the configuration coordinator 160.

Figure 5:
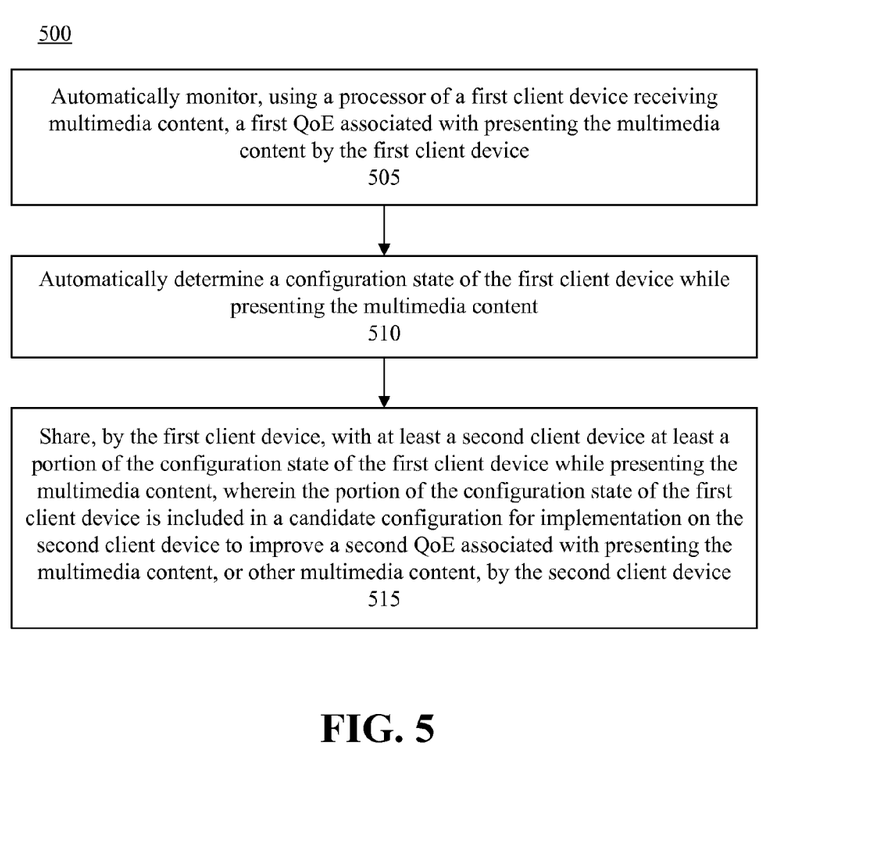
FIG. 5 is a flow chart illustrating an example of a method of sharing a configuration state of a client device that meets a threshold level of QoE.

FIG. 5 is a flow chart illustrating an example of a method 500 of sharing a configuration state of a client device that meets a threshold level of QoE. At step 505, a first QoE associated with presenting multimedia content by the first client device can be automatically monitored using a processor of a first client device receiving the multimedia content. At step 510, a configuration state of the first client device while presenting the multimedia content can be automatically determined. At step 515, at least a portion of the configuration state of the first client device while presenting the multimedia content can be shared, by the first client device, with at least a second client device. The portion of the configuration state of the first client device can be included in a candidate configuration that is a candidate for implementation on the second client device to improve a second QoE associated with presenting the multimedia content, or other multimedia content, by the second client device.

Figure 6:
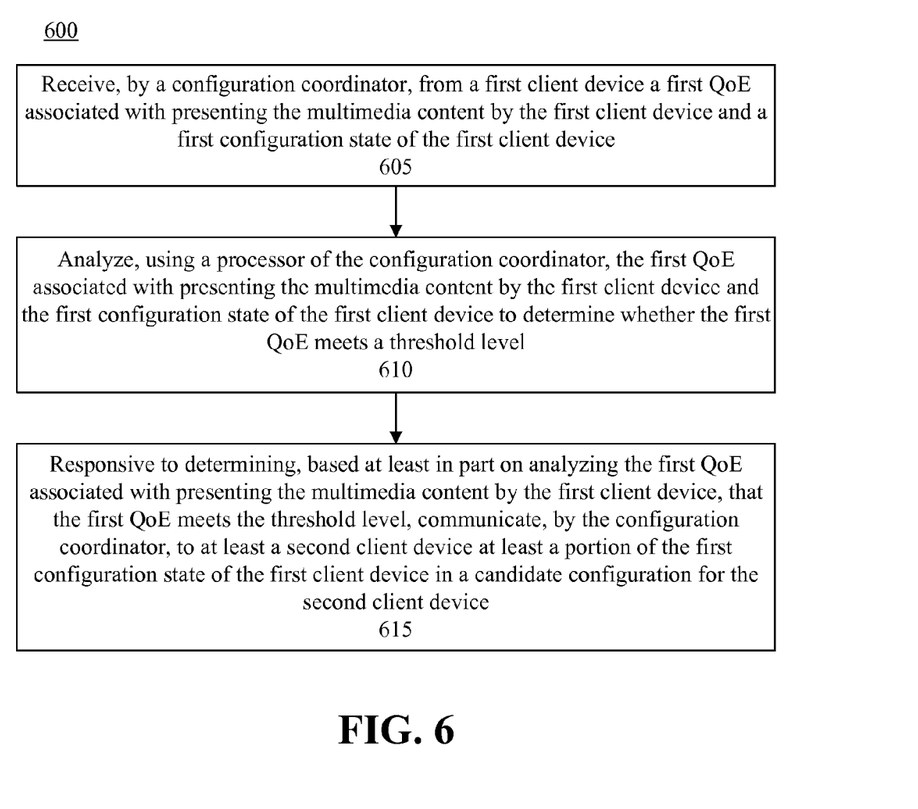
FIG. 6 is a flow chart illustrating another example of a method of sharing a configuration state of a client device that meets a threshold level of QoE.

FIG. 6 is a flow chart illustrating another example of a method 600 of sharing a configuration state of a client device that meets a threshold level of QoE. At step 605, a first QoE associated with presenting the multimedia content by a first client device and a first configuration state of the first client device can be received by a configuration coordinator. At step 610, the first QoE associated with presenting the multimedia content by the first client device and the first configuration state of the first client device can be analyzed using a processor of the configuration coordinator to determine whether the first QoE meets a threshold level. At step 615, responsive to determining, based at least in part on analyzing the first QoE associated with presenting the multimedia content by the first client device, that the first QoE meets the threshold level, at least a portion of the first configuration state of the first client device can be communicated, by the configuration coordinator, to at least a second client device in a candidate configuration for the second client device.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    automatically monitoring, using a processor of a first client device receiving multimedia content, a first QoE associated with presenting the multimedia content by the first client device;
    automatically determining a configuration state of the first client device while presenting the multimedia content; and
    sharing, by the first client device, with at least a second client device at least a portion of the configuration state of the first client device while presenting the multimedia content, wherein the portion of the configuration state of the first client device is included in a candidate configuration that is a candidate for implementation on the second client device to improve a second QoE associated with presenting the multimedia content, or other multimedia content, by the second client device.

2. The method of claim 1, further comprising:
sharing, by the first client device, with at least the second client device the first QoE associated with presenting the multimedia content by the first client device.

3. The method of claim 2, wherein sharing, by the first client device, with at least the second client device the first QoE associated with presenting the multimedia content by the first client device comprises:
communicating to a configuration coordinator the first QoE associated with presenting the multimedia content by the first client device, the configuration coordinator configured to communicate to the second client device the first QoE associated with presenting the multimedia content by the first client device.

4. The method of claim 1, wherein sharing, by the first client device, with at least the second client device at least the portion of the configuration state of the first client device while presenting the multimedia content comprises:
communicating to a configuration coordinator the configuration state of the first client device, the configuration coordinator configured to communicate to the second client device the portion of the configuration state of the first client device.

5. The method of claim 1, wherein sharing, by the first client device, with at least the second client device at least the portion of the configuration state of the first client device while presenting the multimedia content comprises:
communicating from the first client device to the second client device at least the portion of the configuration state of the first client device while presenting the multimedia content.

6. The method of claim 1, further comprising:
receiving, by the first client device, from a configuration coordinator a candidate configuration for the first client device, the candidate configuration comprising at least one configuration setting shared by a third client device; and
updating at least one configuration setting on the first client device in accordance with the candidate configuration for the first client device.

7. The method of claim 6, further comprising:
determining, by the first client device, whether the candidate configuration, or a portion of the candidate configuration, is applicable to the first client device;
wherein updating the at least one configuration setting on the first client device in accordance with the candidate configuration for the first client device is responsive to the first client device determining that the candidate configuration, or a portion of the candidate configuration, is applicable to the first client device.

8. The method of claim 6, further comprising:
receiving, by the first client device, from the configuration coordinator a third QoE associated with the candidate configuration; and
determining, by the first client device, based upon the third QoE, whether the candidate configuration, or a portion of the candidate configuration, will improve on the first QoE associated with presenting the multimedia content by the first client device;
wherein updating the at least one configuration setting on the first client device in accordance with the candidate configuration for the first client device is responsive to the first client device determining the candidate configuration, or a portion of the candidate configuration, will improve on the first QoE associated with presenting the multimedia content by the first client device.

9. The method of claim 6, further comprising:
identifying a completion of presenting the multimedia content by the first client device;
responsive to identifying the completion of presenting the multimedia content by the first client device, automatically reverting the at least one configuration setting on the first client device back to a previous state in which the configuration setting was set prior to updating the at least one configuration state in accordance with the candidate configuration for the first client device.

10. A method, comprising:
receiving, by a configuration coordinator, from a first client device a first QoE associated with presenting the multimedia content by the first client device and a first configuration state of the first client device;
analyzing, using a processor of the configuration coordinator, the first QoE associated with presenting the multimedia content by the first client device and the first configuration state of the first client device to determine whether the first QoE meets a threshold level;
responsive to determining, based at least in part on analyzing the first QoE associated with presenting the multimedia content by the first client device, that the QoE meets the threshold level, communicating, by the configuration coordinator, to at least a second client device at least a portion of the first configuration state of the first client device in a candidate configuration for the second client device.

11. The method of claim 10, further comprising:
responsive to determining, based at least in part on analyzing the first QoE associated with presenting the multimedia content by the first client device, that the QoE meets the threshold level, communicating, by the configuration coordinator, to at least the second client device the first QoE or a third QoE associated with the candidate configuration for the second client device.

12. The method of claim 10, wherein the candidate configuration for the second client device further comprises at least a portion of a second configuration state.

13. The method of claim 10, further comprising:
identifying, by the configuration coordinator, configuration patterns that achieve an acceptable QoE level and configuration patterns that result in a poor QoE level; and
selecting at least the portion of the first configuration state of the first client device based on identifying at least the portion of the first configuration state as conforming to at least one of the configuration patterns that achieve the acceptable QoE level.

* * * * *